(12) United States Patent
Graham et al.

(10) Patent No.: US 9,810,856 B2
(45) Date of Patent: Nov. 7, 2017

(54) STRAIN RELIEVED ADAPTER FOR A JACKETED CABLE AND BOOT

(71) Applicant: US Conec, Ltd, Hickory, NC (US)

(72) Inventors: Joseph L. Graham, Hickory, NC (US); Joseph P. Howard, Hickory, NC (US); Jillcha Fekadu Wakjira, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 15/225,791

(22) Filed: Aug. 1, 2016

(65) Prior Publication Data

US 2016/0356967 A1    Dec. 8, 2016

Related U.S. Application Data

(62) Division of application No. 13/539,387, filed on Jun. 30, 2012, now Pat. No. 9,405,068.

(60) Provisional application No. 61/503,875, filed on Jul. 1, 2011.

(51) Int. Cl.
*G02B 6/38* (2006.01)
*G02B 6/24* (2006.01)

(52) U.S. Cl.
CPC ......... *G02B 6/3887* (2013.01); *G02B 6/241* (2013.01); *G02B 6/3825* (2013.01); *G02B 6/3869* (2013.01)

(58) Field of Classification Search
CPC .. G02B 6/3887; G02B 6/3825; G02B 6/3893; G02B 6/3885; G02B 6/3821; G02B 6/38
See application file for complete search history.

(56) References Cited

U.S. PATENT DOCUMENTS

| | | | |
|---|---|---|---|
| 4,960,317 A | 10/1990 | Briggs | |
| 5,157,749 A | 10/1992 | Briggs | |
| 5,390,272 A * | 2/1995 | Repta | G02B 6/4478 385/100 |
| 5,696,351 A | 12/1997 | Benn et al. | |
| 5,915,058 A * | 6/1999 | Clairardin | G02B 6/3825 385/55 |
| 6,062,895 A * | 5/2000 | Lin | H01R 4/2429 439/404 |
| 7,241,056 B1 * | 7/2007 | Kuffel | G02B 6/3806 385/60 |
| 7,479,027 B1 | 1/2009 | Miller et al. | |
| 8,985,865 B2 | 3/2015 | Howard et al. | |
| 2010/0092147 A1 | 4/2010 | Desard et al. | |
| 2010/0135618 A1 | 6/2010 | Howard et al. | |

* cited by examiner

*Primary Examiner* — Jennifer Doan
(74) *Attorney, Agent, or Firm* — Michael L. Leetzow, P.A.

(57) ABSTRACT

An adapter for a fiber optic connector has provides strain relief for a jacketed cable connected to the adapter and the connector. The adapter preferably has two portions that act together to engage the jacketed cable and a boot that applies pressure to the adapter to secure the adapter. The two portions of the adapter may also be rotatably connected to one another. The boot has a projection that cooperates with an optical component to seal the adapter and optical component from outside particulates.

14 Claims, 9 Drawing Sheets

STRAIN RELIEVED ADAPTER FOR A JACKETED CABLE AND BOOT

REFERENCE TO RELATED CASE

This application claims priority under 35 U.S.C. §119(e) to provisional application No. 61/503,875, filed on Jul. 1, 2011, and to U.S. Pat. No. 9,405,068, issued on Aug. 2, 2016, under 35 U.S.C. §120, which are hereby incorporated by reference in their entirety.

BACKGROUND OF THE INVENTION

Field of the Invention

A low cost, simple-to-manufacture fiber optic ferrule, adapter, and related assembly is needed in high speed applications. One possible alternative is the MTP connector system, but with the available space for the connections becoming smaller, a format that is smaller than the MTP connector system is needed. Similarly, a more simplified connector with a ferrule is also needed so that the connections can be made quickly, reliably, and with minimal parts. The adapter also needs to be able to be connectorized to a jacketed fiber optic cable and have strain relief. Furthermore, the system needs the ability to seal the interface with the optical component to which it will be connected.

Thus, a new adapter and boot assembly has been devised that provides the strain relief, allows for connectorization with optical fibers in a jacketed cable, and provides a seal for environmental contaminants by way of a modified boot.

SUMMARY OF THE INVENTION

The present invention is directed to an adapter to hold and align a fiber optic ferrule, the adapter that includes a main body having a front end, a middle portion, a back end, and an opening extending between the front end and the middle portion, a first projection extending downward from the front end and orthogonal to the opening, a second projection extending downward from the middle portion and orthogonal to the opening, a cover portion extending between the front end and middle portion and partially defining the opening, the cover portion disposed to cover at least a portion of the fiber optic ferrule, the back end configured to receive and engage at least a portion of a fiber optic cable, the back end having at least one projection extending from an inside surface to engage the fiber optical cable, and a back cover, the back cover configured to engage at least a portion of the back end of the main body, the back cover having at least one projection extending from an inside surface thereof to engage the fiber optic cable.

In some embodiments, the adapter also includes a boot, the boot configured to cover at least a portion of the back end of the main body and the back cover, the boot providing compression to the back end of the main body and the back cover.

In other embodiments, the at least one of the back end of the main body and the back cover has a latch member and the other of the back end of the main body and the back cover has a latch receiving member to engage the latch member to secure the back end of the main body and the back cover to one another.

In another aspect, the present invention is directed to a boot for use with an adapter, the boot that includes a main body having a first end configured for attachment to the adapter, a second end opposite the first end, and a passageway extending from the first end to the second end configured to receive a portion of a fiber optic cable and a portion of the adapter, the main body being flexible so as to be bendably deflectable with the portion of the fiber optic cable, and at least one radially outwardly projecting rib, the at least one radially projecting rib disposed adjacent the first end and being compressible, the at least one radially outwardly projecting rib having a forward surface facing outward away from the main body.

In some embodiments, wherein the at least one radially outwardly projecting rib is configured to engage an optical component adjacent an opening in the optical component, the at least one radially outwardly projecting rib sealing the opening in the optical component.

In other embodiments, he adapter includes a back end and a back cover, the back end configured to receive and engage at least a portion of a fiber optic cable and the back cover configured to engage at least a portion of the back end of the main body and the fiber optic cable.

Additional features and advantages of the invention will be set forth in the detailed description which follows and, in part, will be readily apparent to those skilled in the art from that description or recognized by practicing the invention as described herein, including the detailed description, the claims, and the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
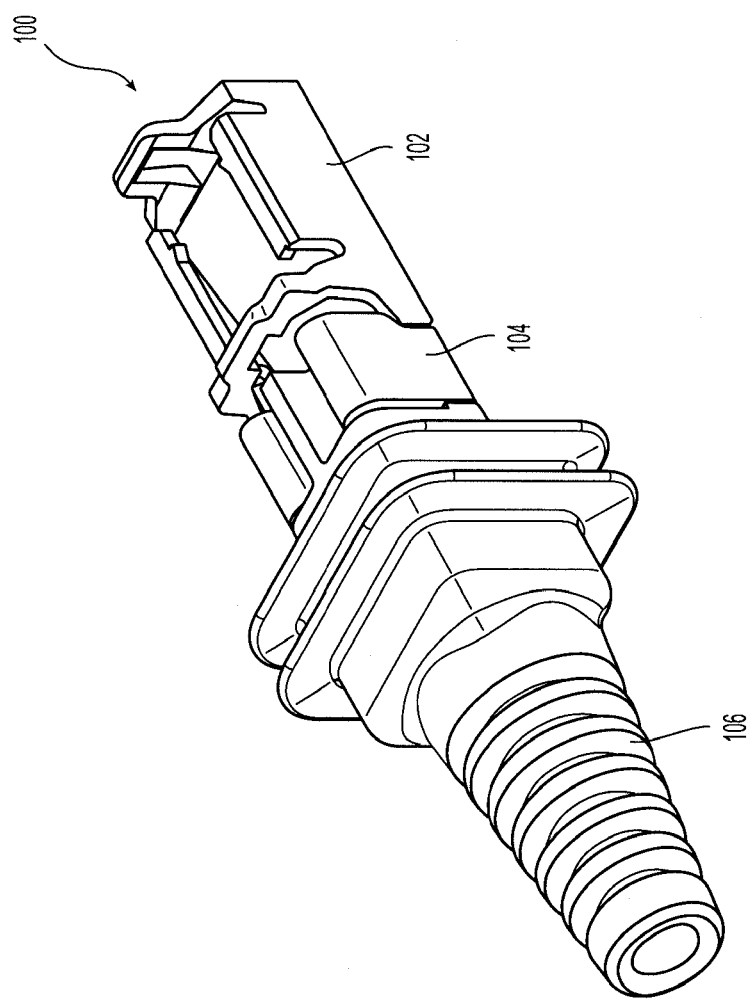
FIG. 1 is a perspective view of the bottom side of one embodiment of an adapter and boot according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
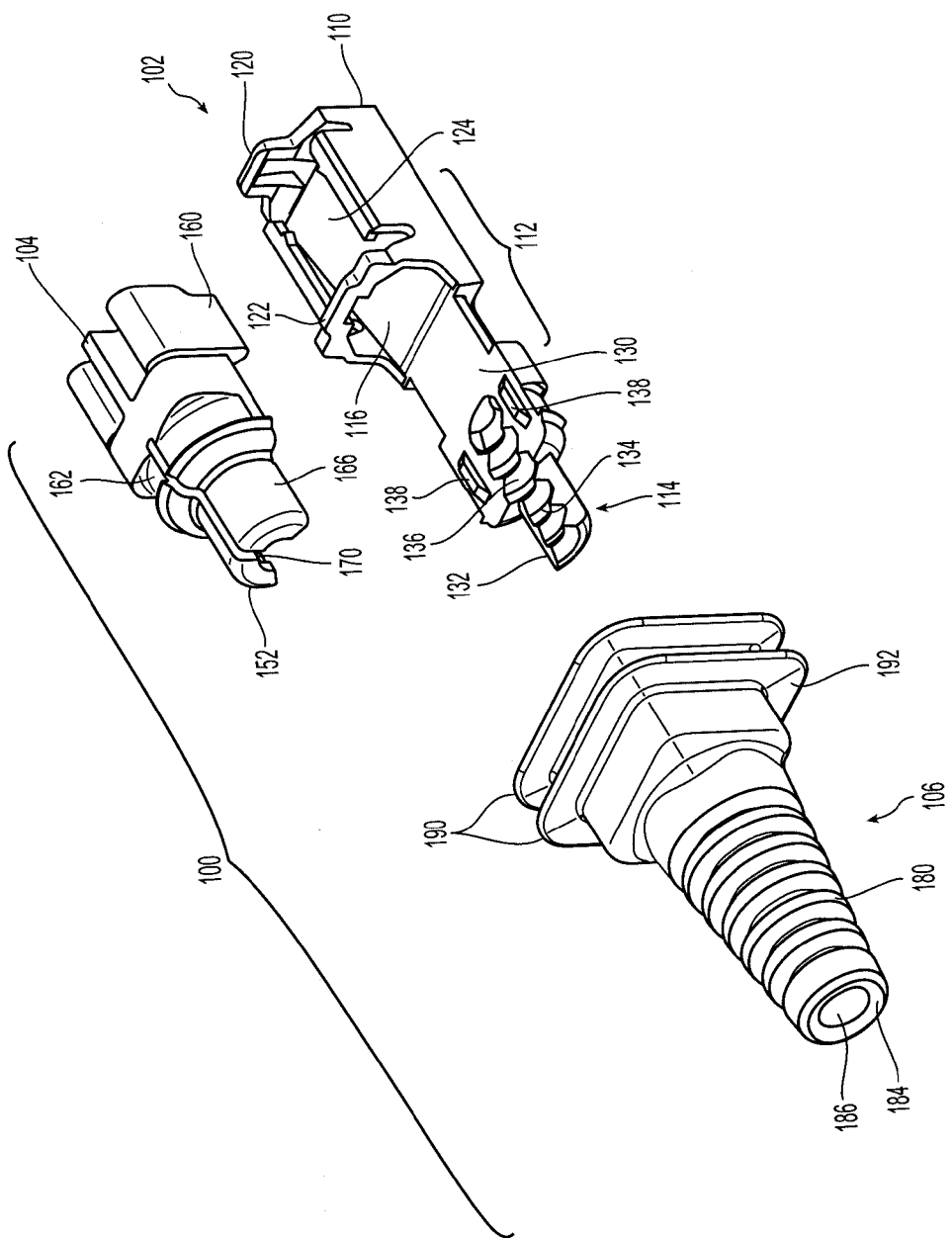
FIG. 2 is an exploded view of the adapter and boot of FIG. 1.
Figure 3:
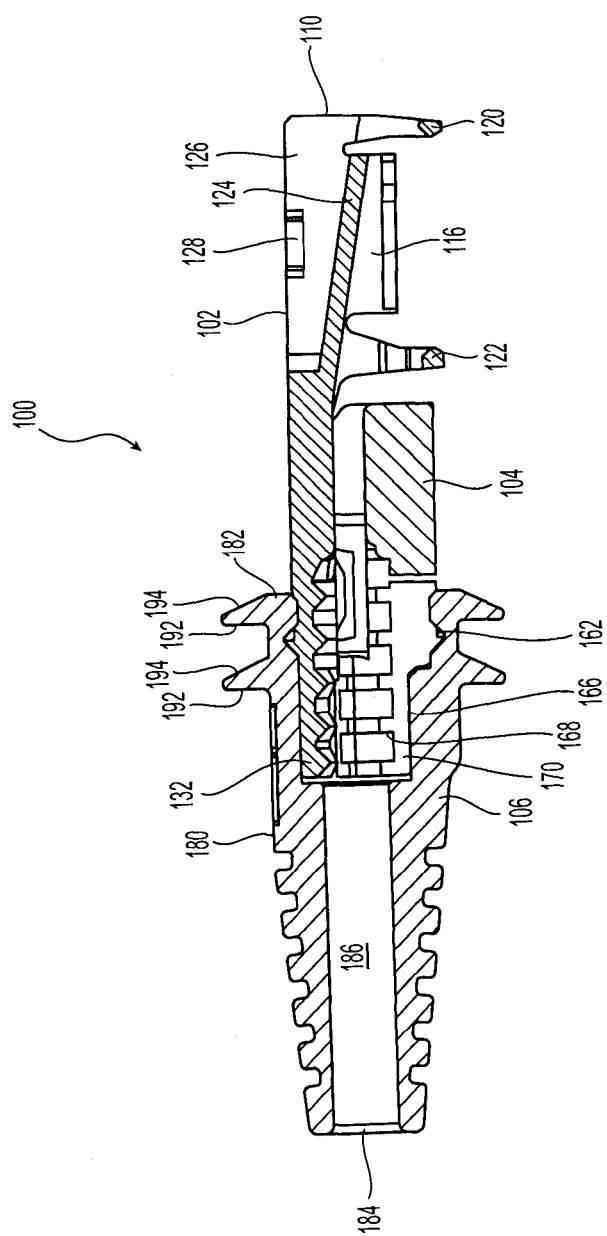
FIG. 3 is a cross section of the adapter and boot of FIG. 1.

Referring to FIGS. 1-3, one embodiment of an adapter 100 according to the present invention is illustrated. The adapter 100 has a main body 102, a back cover 104, and may include a strain relief boot 106. The main body 102 has a front end 110, a middle portion 112, a back end 114, and an opening 116 extending between the front end 110 and the middle portion 112. The opening 116 is configured to receive and retain in a known relationship to the adapter 100 a fiber optic ferrule 200 (see FIG. 4.). The main body 102 also has a first projection 120 extending downward from the front end 110 and orthogonal to the opening 116 and a second projection 122 extending downward from the middle portion 112 and orthogonal to the opening 116. The first and second projections 120,122 are used to engage projections on a transceiver or other optical component to optically link the fiber optic ferrule 200 with the optical component. A full description of the fiber optic ferrule, front portion of the adapter and the optical component are fully described in copending application Ser. No. 12/540,193, the contents of which are incorporated in its entirety herein.

The main body 102 also has a cover portion 124 extending between the front end 110 and middle portion 112 and partially defining the opening 116. The cover portion 124 also covers at least a portion of the fiber optic ferrule 200 (see FIG. 4). The main body 102 may also include a passage 126 opposite the cover portion 124 to allow for optical fiber management of neighboring assemblies. The passage 126 may also include tabs 128 that can be used to secure and remove the adapter 100 from the optical component. Structures other than the tabs 128 may be used to remove the adapter 100 and still be within the scope of the present invention.

Figure 4:
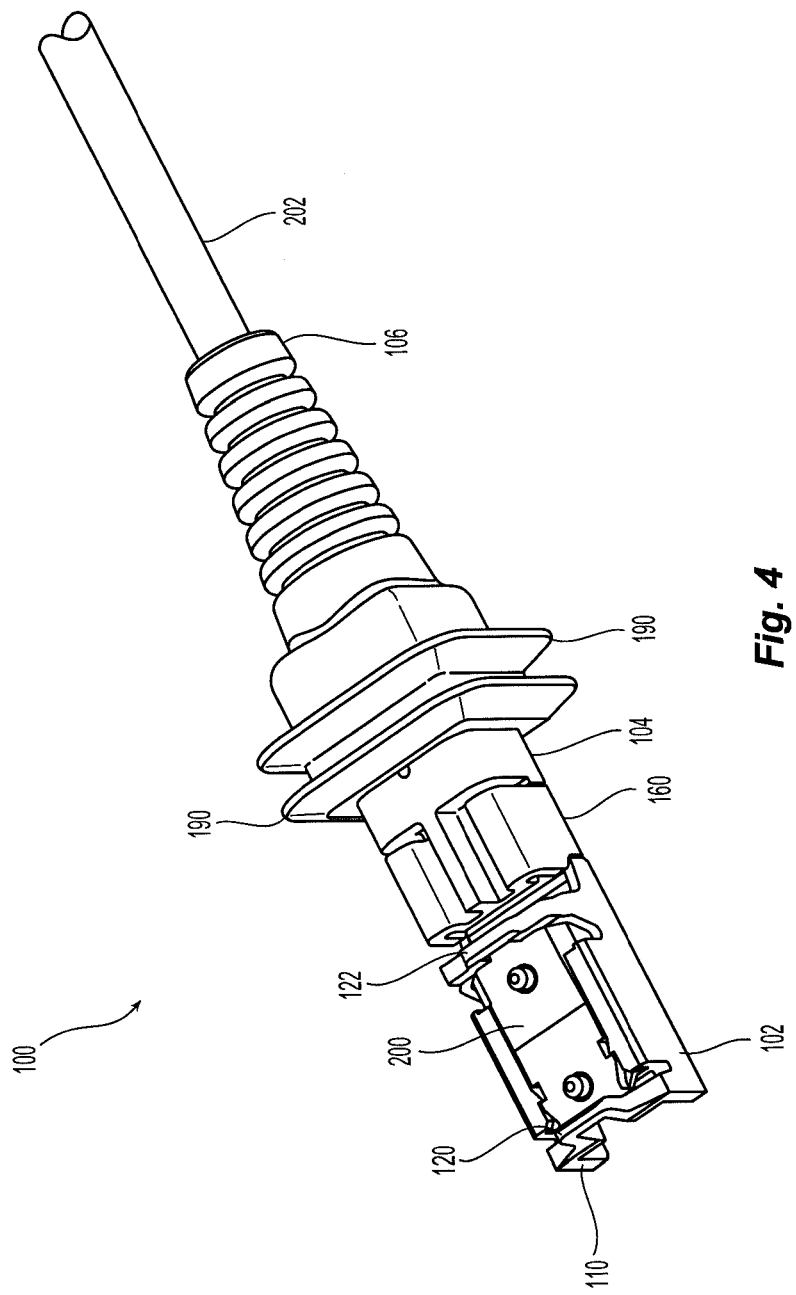
FIG. 4 is a bottom view of the adapter and boot of FIG. 1 with a fiber optic ferrule in the adapter.

The back end 114 of the main body 102 is configured to receive and engage at least a portion of a fiber optic cable 202 (FIG. 4). The back end 114 has a flat portion 130 that is disposed between the opening 116 and the back end 114. The flat portion 130 allows for the optical fibers in the fiber optic cable to be fanned out and managed before entering and being secured in the fiber optic ferrule 200. Adjacent the flat portion 130 is the rounded back end 132, with at least one projection 134 extending from an inside surface 136 to engage the fiber optical cable 202. As illustrated best in FIGS. 2 and 3, there are several of the projections 134 that extend into the rounded back end 132. The back end 114 also has projections 138 on either side of the rounded back end 132 to engage corresponding openings in the back cover 104 to assist in stabilizing the back end 114.

Figure 5:
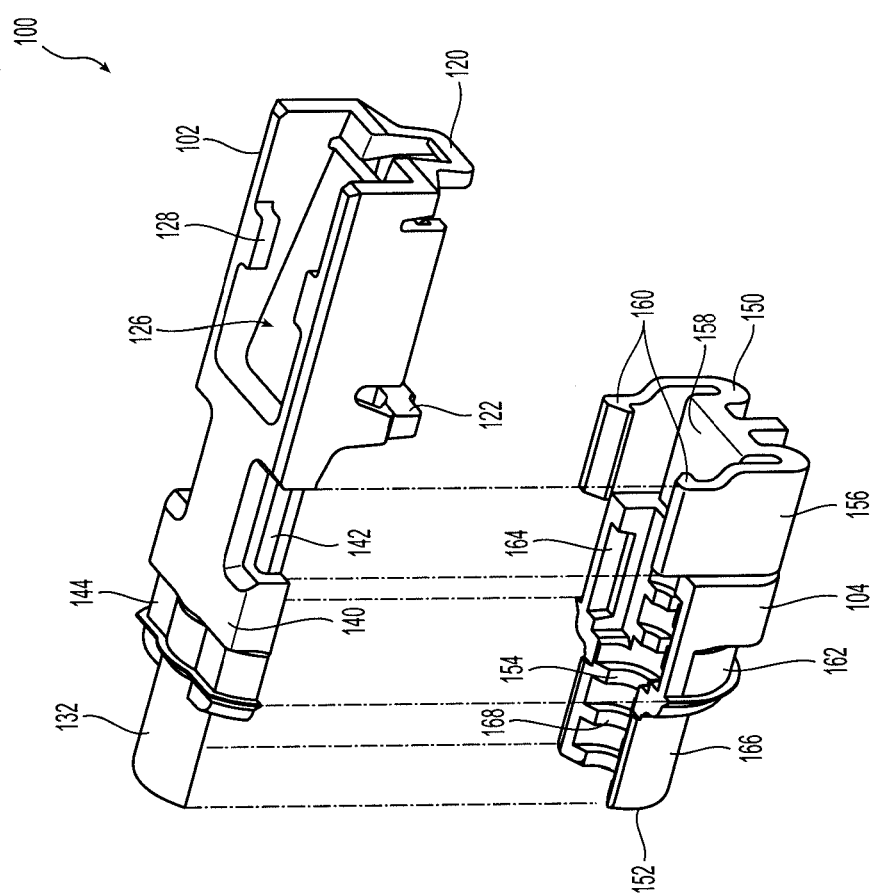
FIG. 5 is an exploded view of the upper side of the adapter of FIG. 1.

As best seen in FIG. 5, on the outside surface 140 of the back end 114 are two flat surfaces 142 that are used by flanges on the back cover 104 to secure the two pieces to one another as described in more detail below. Between the two flat surfaces 142 and the rounded back end 132 is a boot receiving area 144 where the strain relief boot 106 is pushed onto the adapter 100.

The back cover 104 mates to the back end 114 of the main body 102 to make a complete unit. The back cover 104 has a front end 150, a back end 152, an inside surface 154, and an outside surface 156. The front end 150 has a flat portion 158 that corresponds to the flat portion 130 in the main body 102. On either side of the flat portion 158 are two flange members 160 that are configured to engage the flat surfaces 142 when the main body 102 and the back cover 104 are mated. The back cover 104 also has a boot receiving area 162 on the outside surface 156. The inside surface 154 has openings or indentations 164 that receive the projections 138 on the rounded back in 132 of the main body 102.

The backend 152 of the back cover 104 also has a rounded portion 166. As can be understood from FIG. 2, when the main body 102 and the back cover 104 are mated, a generally cylindrical opening is formed to engage the fiber optic cable 200. On the inside surface 154 of the back cover 104 are projections 168 that engage the outside of the fiber-optic cable 200. As can be best seen in FIG. 2, a longitudinal groove 170 extends from the backend 152 of the back cover 104 up to the boot receiving area 162. A similar groove or opening also exists at the back end 114 along the corresponding surfaces of the main body 102 and the back cover 104. These grooves allow the back end of adapter 100 to flex and be tightened around the fiber-optic cable 200 when the strain relief boot 106 is placed over the adapter 100.

Figure 8:
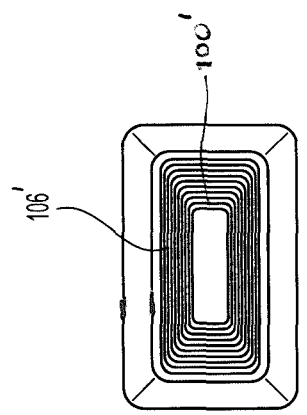
FIG. 8 is an end view of an alternative embodiment of an adapter according to the present invention showing the adapter with a rectangular end for use with ribbons.

As illustrated in FIG. 8, the back end of the another embodiment of the adapter 100', as seen through the boot 106', may have a configuration other than the round configuration noted above. For example, the back end of the adapter 100' may also have a generally rectangular opening to receive fiber optic ribbons rather than the fiber optic cable 200.

The strain relief boot 106 has a main body 180. The main body 180 has a first end 182 configured to be attached to the backend of the adapter 100 and a second end 184 to provide strain relief for the fiber optic cable 200. The main body 180 has an passageway or opening 186 extending between the first end 182 and the second end 184 to receive part of the adapter 100 and the fiber optic cable 200. The opening 186 is sized to compress the back end of the adapter 100 to at least partially compress the back end thereof. The strain relief boot 106 is similar to conventional strain relief boots in that it protects fiber-optic cable as it exits from the adapter 100 and prevents side loads from bending the fiber optic cable 200 and damaging it.

The strain relief boot 106 also has at least one radially extending portion 190 extending at least a portion of the way around the strain relief boot 106. As illustrated in the figures, there are two radially extending portions 190 that extend all the way around the strain relief boot 106. The radially extending portions 190 have a flat rear surface 192 and a forward facing surface 194 that faces outward away from the strain relief boot 106. That is, the forward facing surface 194 points upward and away from the boot and not directly forward along the length of the strain relief boot 106. This means that the flat rear surface 192, which does point directly along the length of the strain relief boot 106, and the forward facing surface 194 are not parallel to one another.

Figure 6:
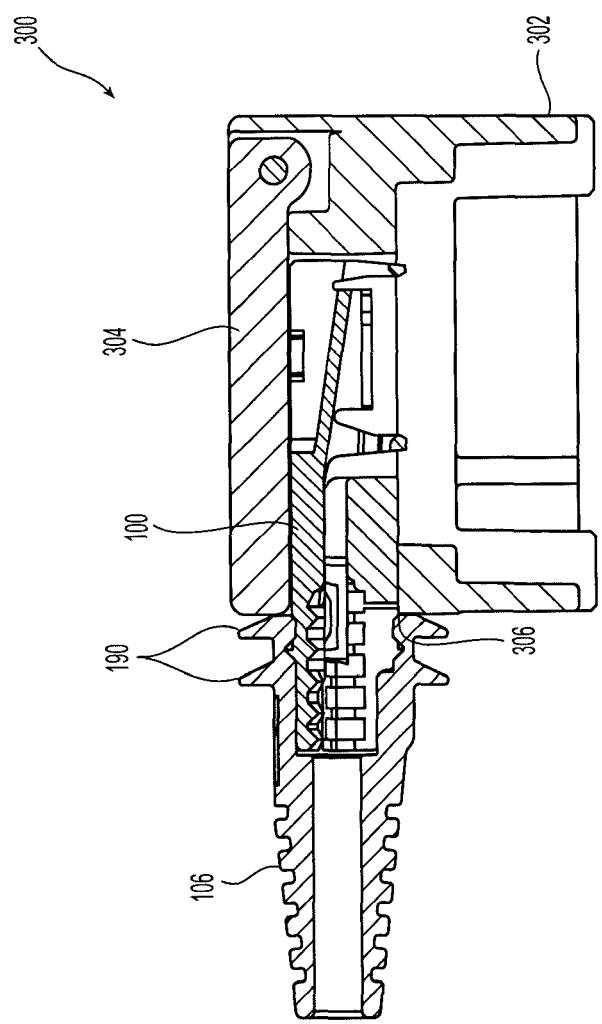
FIG. 6 is a cross section view of the adapter and boot of FIG. 1 with a fiber optic ferrule installed in a transceiver.

As illustrated in FIG. 6, the adapter 100 with the strain relief boot 106 can be used with an optical component 300, such as a transceiver. The fiber optic ferrule 200 has been removed from the adapter 100 for clarity. The optical component 300 has a main body 302 to receive and hold the adapter 100 in optical alignment. The optical component 300 may also have a cover 304 that is closed after the adapter 100 is installed. The cover 304 can prevent contaminants and particulates from entering into the optical component 300, but there may be gaps around the back end of the adapter 100 where it enters into the optical component 300. Thus, the strain relief boot 106 has the radially extending portions 190 that are larger than the opening 306 formed by the main body 302 and the cover 304. The strain relief boot 106, made of an elastomeric material, is biased against the opening 306 to seal it and prevent contaminants and particulates from entering.

Figure 7:
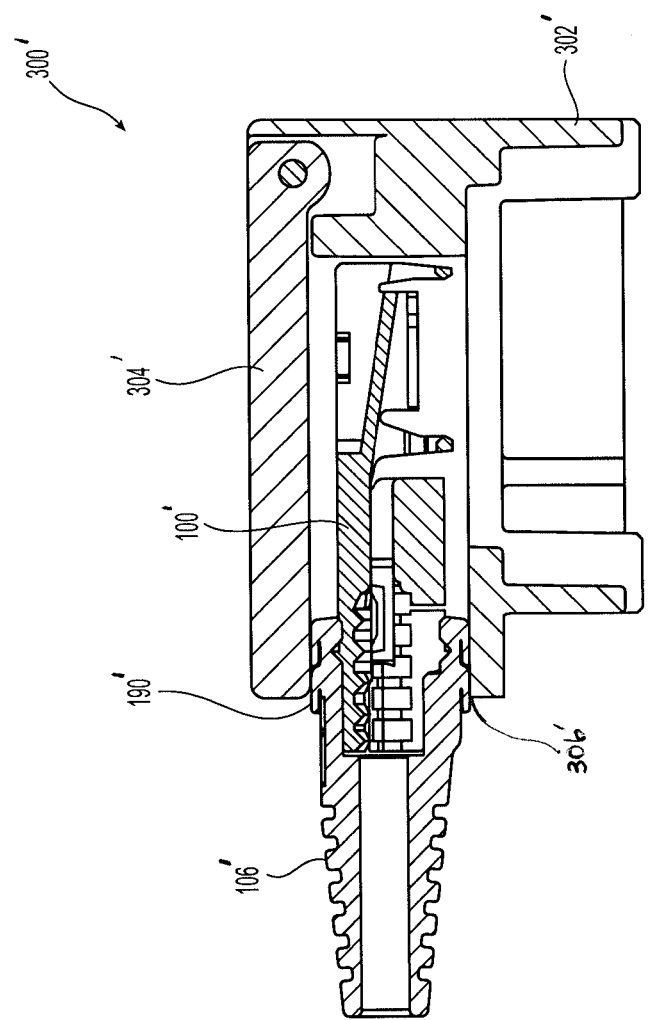
FIG. 7 is a cross section view of a adapter and boot of FIG. 1 with a fiber optic ferrule installed in a second transceiver.

An alternative arrangement of the adapter 100 with the strain relief boot 106 and an optical component 300' is illustrated in FIG. 7. A portion of the strain relief boot 106 is disposed within the opening 306' formed by the main body 302' and the cover 304'. With the boot 106 being made of the elastomer, the radially extending portions 190' are easily bent over to seal the opening 306' around the adapter 100 and the optical component 300'. Other configurations of the optical component 300', the main body 302' and the cover 304' are also possible to seal the opening 306'.

Figure 9:
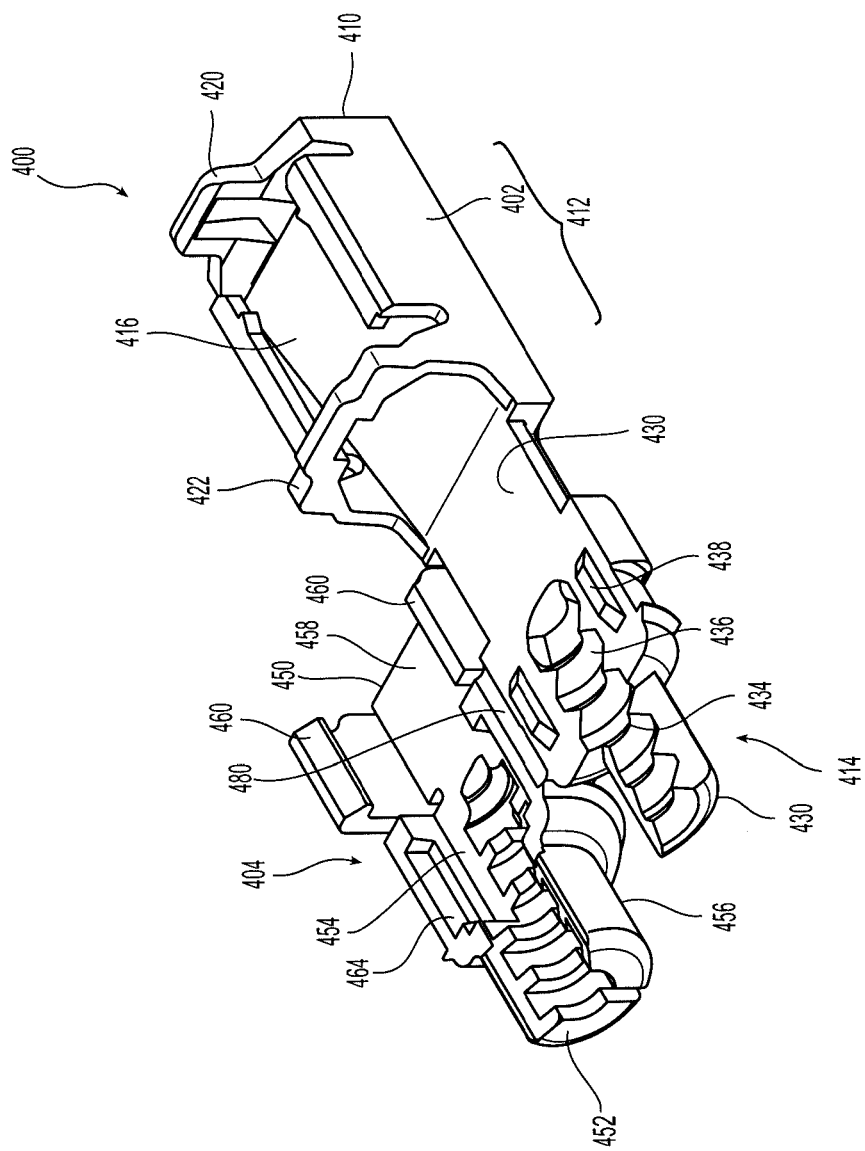
FIG. 9 is an alternative embodiment of an adapter according to the present invention.

FIG. 9 illustrates another embodiment of an adapter 400 according to the present invention. This adapter 400 also has a main body 402, a back cover 404, and may include a strain relief boot as in the first embodiment. The main body 402 has a front end 410, a middle portion 412, a back end 414, and an opening 416 extending between the front end 410 and the middle portion 412. The main body 402 also has a first projection 420 extending downward from the front end 410 and orthogonal to the opening 416 and a second projection 422 extending downward from the middle portion 412 and orthogonal to the opening 416.

The back end 414 of the main body 402 is configured to receive and engage at least a portion of a fiber optic cable 202. The back end 414 has a flat portion 430 that is disposed between the opening 416 and the back end 414. Adjacent the flat portion 430 is the rounded back end 432, with at least one projection 434 extending from an inside surface 436 to engage the fiber optical cable 202. As illustrated, there are several of the projections 434 that extend from the rounded back end 432. The back end 414 also has projections 438 on either side of the rounded back end 432 to engage corresponding openings in the back cover 104 to assist in stabilizing the back end 414.

The back cover 404 mates to the back end 414 of the main body 402 to make a complete unit. The back cover 404 has a front end 450, a back end 452, an inside surface 454, and an outside surface 456. The front end 450 has a flat portion 458 that corresponds to the flat portion 430 in the main body 402. On either side of the flat portion 458 are two flange members 460 that are configured to engage the flat surfaces 442 when the main body 402 and the back cover 404 are mated. The inside surface 454 has openings or indentations 464 that receive the projections 438 on the rounded back in 432 of the main body 402. Adjacent the openings or indentations 464 in the back cover 404 and the projections 438 on the main body 402 is a hinge 480 that connects the back cover 404 and the main body 402. Preferably the hinge 480 is a living hinge, but could be any suitable type of hinge. This allows the components of the adapter 400 to be an integral or unitary piece.

Figure 10:
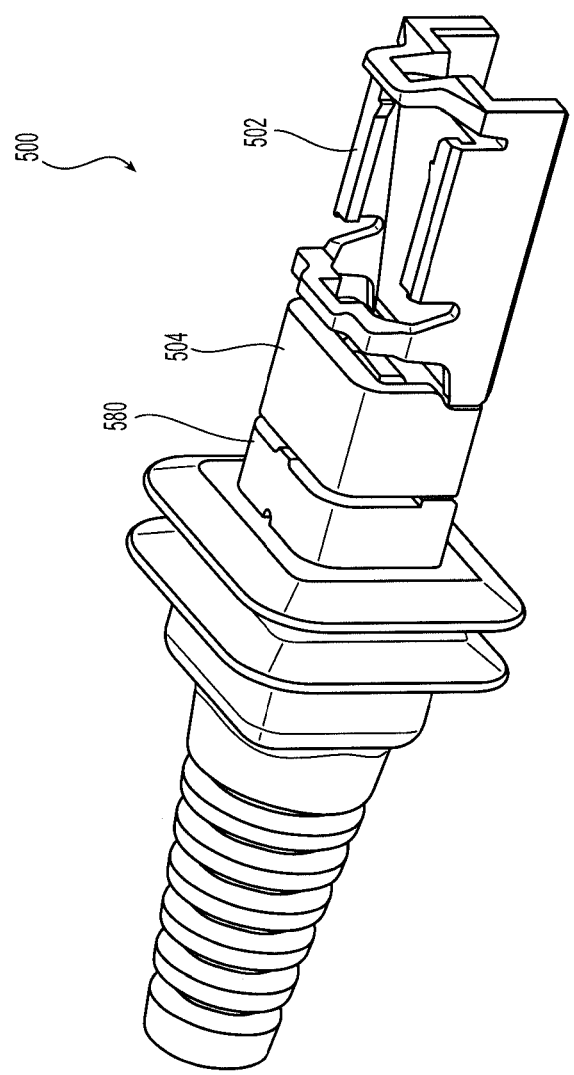
FIG. 10 is alternative embodiment of an adapter according to the present invention illustrating a clip to secured the adapter together.

Another embodiment of an adapter 500 is illustrated in FIG. 10. In adapter 500, rather than having two flange members to connect the back cover 504 and the main body 502, a clip 580 is placed over the back cover 504 and engages the main body 502.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A strain relief boot for use with an adapter, the strain relief boot comprising:
    a main body having a first end configured for attachment to the adapter, a second end opposite the first end, and a passageway extending from the first end to the second end configured to receive a portion of a fiber optic cable and a portion of the adapter, the main body being flexible so as to be bendably deflectable with the portion of the fiber optic cable; and
    at least one radially outwardly projecting rib, the at least one radially projecting rib disposed adjacent the first end and being compressible, the at least one radially outwardly projecting rib having a forward surface facing outward away from the main body.

2. The strain relief boot according to claim 1, wherein the at least one radially outward projecting rib comprises two radially outward projecting ribs.

3. The strain relief boot according to claim 1, wherein the at least one radially outwardly projecting rib at least partially encircles the strain relief boot.

4. The strain relief boot according to claim 1, wherein the at least one radially outwardly projecting rib completely encircles the strain relief boot.

5. The strain relief boot according to claim 1, wherein the at least one radially outwardly projecting rib is configured to engage an optical component adjacent an opening in the optical component, the at least one radially outwardly projecting rib sealing the opening in the optical component.

6. The strain relief boot according to claim 5, wherein optical component is a transceiver.

7. The strain relief boot according to claim 1, wherein the adapter includes a back end and a back cover, the back end configured to receive and engage at least a portion of a fiber optic cable and the back cover configured to engage at least a portion of the back end of the main body and the fiber optic cable.

8. A strain relief boot for use with an adapter, the strain relief boot comprising:
    a main body having a first end, a second end opposite the first end, and a passageway extending from the first end to the second end and configured to receive a portion of a fiber optic cable and a portion of the adapter, the first end having an outer surface; and
    at least one radially outwardly projecting rib, the at least one radially projecting rib disposed adjacent the first end and being compressible, the at least one radially outwardly projecting rib having a first surface and an opposing second surface, the at least one radially outwardly projecting rib movable between a first position whereby the first surface faces along a length of the main body and a second position whereby the first surface faces and is generally parallel to the outer surface of the first end.

9. The strain relief boot according to claim 8, wherein the at least one radially outward projecting rib comprises two radially outward projecting ribs.

10. The strain relief boot according to claim 8, wherein the at least one radially outwardly projecting rib at least partially encircles the main body.

11. The strain relief boot according to claim 8, wherein the at least one radially outwardly projecting rib completely encircles the main body.

12. The strain relief boot according to claim 8, wherein the at least one radially outwardly projecting rib is configured to engage an optical component adjacent an opening in the optical component, the at least one radially outwardly projecting rib sealing the opening in the optical component.

13. The strain relief boot according to claim 8, wherein the at least one radially outwardly projecting rib is configured to engage an inside surface of an optical component adjacent an opening therein, the at least one radially outwardly projecting rib sealing the opening in the optical component.

14. A strain relief boot for use with an adapter having two components, the strain relief boot comprising:
   a main body having a first end configured for attachment to the adapter, a second end opposite the first end, and a passageway extending from the first end to the second end configured to receive a portion of a fiber optic cable and a portion of the two component adapter, the main body being flexible so as to compress the two components of the adapter within the passageway; and
   at least one radially outwardly projecting rib, the at least one radially projecting rib disposed adjacent the first end and being compressible, the at least one radially outwardly projecting rib having a forward facing surface and an opposing rearward facing surface.

* * * * *